(12) United States Patent
Hsieh et al.

(10) Patent No.: US 8,832,615 B2
(45) Date of Patent: Sep. 9, 2014

(54) METHOD FOR DETECTING AND DEBUGGING DESIGN ERRORS IN LOW POWER IC DESIGN

(71) Applicants: Synopsys, Inc., Mountain View, CA (US); Synopsys Taiwan Co. Ltd., Taipei (TW)

(72) Inventors: Ming Han Hsieh, Taipei (TW); Chih-Neng Hsu, Pingtung County (TW); Ming-Hui Hsieh, Miaoli County (TW)

(73) Assignees: Synopsys, Inc., Mountain View, CA (US); Synopsys Taiwan Co., Ltd., Taipei (TW)

( * ) Notice: Subject to any disclaimer, the term of this patent is extended or adjusted under 35 U.S.C. 154(b) by 0 days.

(21) Appl. No.: 13/891,062

(22) Filed: May 9, 2013

(65) Prior Publication Data

US 2013/0305207 A1 Nov. 14, 2013

Related U.S. Application Data

(60) Provisional application No. 61/645,071, filed on May 10, 2012.

(51) Int. Cl.
*G06F 9/455* (2006.01)
*G06F 17/50* (2006.01)

(52) U.S. Cl.
USPC ............................ 716/106; 716/109; 716/133

(58) Field of Classification Search
USPC .......................................... 716/106, 109, 133
See application file for complete search history.

(56) References Cited

U.S. PATENT DOCUMENTS

| | | | |
|---|---|---|---|
| 2007/0245278 A1* | 10/2007 | Chen | 716/5 |
| 2008/0127015 A1* | 5/2008 | Chandramouli et al. | 716/5 |
| 2009/0106720 A1* | 4/2009 | Nagata | 716/6 |
| 2011/0320991 A1* | 12/2011 | Hsu et al. | 716/103 |

* cited by examiner

*Primary Examiner* — Suresh Memula
(74) *Attorney, Agent, or Firm* — Kilpatrick Townsend & Stockton LLP (57) ABSTRACT

A method for detecting anomalies in signal behaviors in a simulation of a low power IC includes receiving a circuit design and a power specification of the IC, determining at least one power sequence checking rule from the power specification, simulating the circuit design and the power specification to obtain a dump file, identifying at least one anomaly of the at least one power sequence checking rule based on the dump file, and generating information relevant to the identified anomaly of the at least one power sequence checking rule. The method further includes setting up a context in a debugger for debugging the anomaly by displaying a waveform of misbehaved signals associated with the anomaly in a waveform window, and a portion of the circuit design and/or a portion of the power specification associated with the anomaly in a text window.

20 Claims, 8 Drawing Sheets

```
module A(clk,a,b,c)
  input clk,a,b;
  output c;
  c = a&b;
end module
```

HDL

```
create_power_domain PD_FSM \
-elements {CHILD1 CHILD2 CHILD3}
create_power_domain PD_ALUB \
set_isolation iso_PCU -domain \
PD_PCU -elements systm.a.b \
-isolation_power_net VDD_TOP \
-clamp_value 1 -applies_to outputs
...
``` xPF

METHOD FOR DETECTING AND DEBUGGING DESIGN ERRORS IN LOW POWER IC DESIGN

CROSS-REFERENCES TO RELATED APPLICATIONS

This application claims the benefit of and priority to U.S. Provisional Application No. 61/645,071, filed May 10, 2012, the entirety of which is incorporated by reference herein for all purposes.

BACKGROUND OF THE INVENTION

1. Field of the Invention

The present invention relates to debugging a low power IC design and, in particular, to debugging of a low power IC design using power sequence checking rules.

2. Description of the Related Art

With the rapid progress of mobile devices and consumer electronic equipment in recent years, there are more and more sophisticated gadgets that are available to the public, such as smart cellular phones, personal mobile computers, MP3 audio players, notebooks and digital cameras. As additional functions and low power consumption are needed in thinner and lighter electronic products, IC designers wish to integrate varieties of discrete components on one chip to suit these requirements, which allows fewer components for a system design and smaller size of a printed circuit board (PCB). For example, system-on-chip (SoC) design becomes much more complex and harder to debug as more and more digital circuit and low power network designs are integrated into one chip. In many low power designs, a circuit design is divided into a multitude of parts and each part, called a power domain, has its own power supply. In other words, a power domain is a collection of instances, pins and ports that share the same power distribution network (voltage). Some of the power domains can be turned on or off by power switches. The objective of using a power switch is to turn off power supply to unused parts of the power domains to conserve power.

Figure 1:
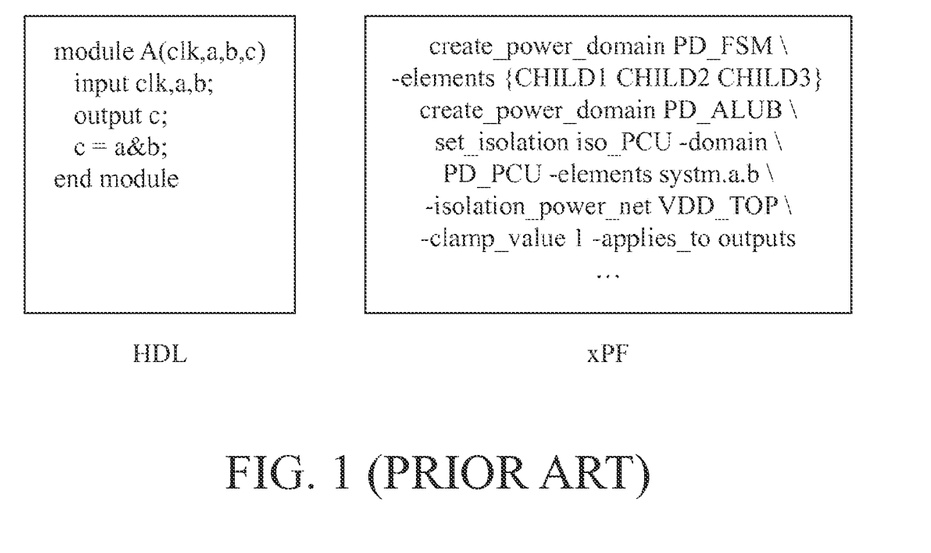
FIG. 1 is an example of a conventional low power circuit design.

Referring to FIG. 1, a digital circuit design is conventionally implemented in hardware description language (HDL). HDL design files, HDL netlists, or HDL code can be simulated with test benches to verify their functionality. Verilog and VHDL are two commonly used HDLs. In the example shown in FIG. 1, a HDL netlist includes a module A having inputs clk, a, b, and output c. In addition to the HDL netlist, IC designers may separately describe the "power intent" (intended power behavior) aspect of the IC in a low power specification. There are two low power specifications: One is the Common Power Format (CPF) developed by Cadence Design Systems and managed by the Silicon Integration Initiative's (Si2's) Low Power Coalition. The other one is the Unified Power Format (UPF). These two CPF and UPF are herein referred to as xPF format, xPF file, or xPF specification. The xPF specification enables designers to specify design intents as power management information in a separate file without modifying the HDL code (Verilog or VHDL netlists). The xPF specification also provides other elements such as isolation cells, level shifter cells, and retention cells for power domains which are essential for proper functioning across power switching. The power format is just a format to describe low power intent for design implementation, analysis and verification, and it is not limited to the CPF or UPF as long as it serves the low power design purpose. An exemplary syntax of the xPF commands includes "create_power_domain_PD_FSM" and "set_isolation iso_PCU-domain," as shown in FIG. 1.

Since traditional hardware description languages (HDL) are not adequate to specify the power design information, power formats, such as xPF files, provide a format without touching the existing HDL codes. For instance, xPF provides a command, create_power_domain, for creating a power domain and grouping design instances sharing the same power domain together. Other power components, such as power switches, isolation cells, and level shifters can be easily created by using the corresponding commands defined within the xPF files.

Once the HDL design and the power design based on the power format are taken into consideration, the entire IC design can be analyzed and a subsequent debugging simulation can be performed. Because HDL descriptions and xPF descriptions are in separate files, it is cumbersome for IC designers to detect and debug when there is an anomaly in signal behaviors. Moreover, both HDL and xPF are text descriptions, which make it even harder for designers to have a full picture in mind for detecting and debugging anomalies or errors between the IC design and power specification.

Therefore, what is needed is a systematic way to detect and debug errors in a lower power IC design to ensure that the entire IC design is correct.

BRIEF SUMMARY OF THE INVENTION

Embodiments of the present invention provide a systematic way to detect and debug anomalies for a low power IC design to ensure that the entire design including the power specification, the HDL design and the interactions between them is correct.

One embodiment in the present invention is to provide a method for detecting anomalies in signal behaviors in a simulation of a low power IC. The method includes: receiving, at a computing device, a circuit design and a power specification having a power domain of a portion of the circuit design, determining, with one or processing units of the computing device, at least one power sequence rule based on the power specification, identifying, with the one or more processing units, at least one anomaly of the circuit design and the power specification, and generating, with the one or more processing units, information relevant to the identified anomaly of the at least one power sequence rule.

In one embodiment, after the at least one anomaly in signal behaviors is detected, the method may further include setting up a context in a debugger for debugging the anomaly. In one embodiment, the method may include displaying a waveform of misbehaved signals associated with the anomaly in a waveform window and centering the waveform window around a simulation time at which the anomaly is detected. Some embodiments of the present invention may provide a waveform view, a schema view, a textual view and/or a "power map" view to enable designers to inspect and debug the anomaly.

The present invention will be understood more fully from the detailed description given below and from the accompanying drawings of the preferred embodiments of the invention, which, however, should not be taken to limit the invention to the specific embodiments, but are for explanation and understanding only.

BRIEF DESCRIPTION OF THE DRAWINGS

The foregoing aspects and many of the accompanying advantages of this invention will become more readily appreciated with the following detailed description in conjunction with the accompanying drawings, in which.

DETAILED DESCRIPTION OF THE INVENTION

The embodiments are presented for purposes of illustrations only, they are not intended to limit the scope of the present invention. An IC design is typically performed using electronic design automation (EDA) tools running on a computing apparatus (computer, server). A designer captures an IC design using schematic editor or describes the IC design using a high-level description language. A low power IC design is generally partitioned into many parts according to their functions and speed requirements. A netlist can be created to define the parts and specifies how the parts are interconnected. The netlist can be used for simulation and implementation of the design. A power specification can be generated to insert specific cells or blocks to guide the implementation of the low power IC design. The power specification is generated in a file separate from the IC design file. The following sections will describe a method for detecting and debugging anomalies or errors in the design process of a low power IC design.

xPF descriptions define power domains, power modes, isolation cells, retention cells and level shifter cells for HDL design files. xPF files are to be submitted to a logic simulator along with HDL design files. During simulation of the HDL files, the simulator also evaluates the descriptions in the xPF files and set values for affected signals accordingly. Abnormal signal behaviors may occur because of errors in HDL descriptions, errors in xPF descriptions, mismatches between HDL and xPF descriptions, and other unexpected simulator bugs. For the purpose of clarity, the term "power specification" is defined herein as the descriptions of the power intent (intended power behavior) of a circuit design. Accordingly, power specification can use xPF descriptions or any other suitable descriptions to specify the power intent on a circuit design.

In accordance with the present invention, it is observed that, based on a power specification, certain patterns in signal behaviors are expected. By analyzing the high level (e.g., HDL) circuit design descriptions and the results of simulation runs (e.g., simulation dump file), a computing apparatus according to an embodiment of the present invention can detect and report to designers signal behaviors that do not match the power specification. In accordance with one embodiment of the present invention, once an anomaly is identified, the correct context for debugging the identified anomaly can be brought up automatically by the computing apparatus so that designers can debug the identified anomaly quickly and efficiently.

Furthermore, by integrating a debugging tool in the computing apparatus, when a signal anomaly is detected, the computing apparatus can put the designer in the right context of a waveform view, a schema view, a textual view and/or a "power map" view to let the designer inspect and debug the anomaly. In an embodiment, the power map is a graphic window, which presents the low power information at the top level of the power map, to help designers understand the power structure and the relationship between a power network design and a circuit design quickly for easy debugging. In an embodiment, the power map may include power domains, isolation cells, level shifters, power switches and power supplies.

A power domain can be shut down or its supply voltage can be lowered. Circuit elements within the same power domain are operating under the same power conditions. A power switch is used to specify the condition to shut down a specific power domain based on some particular control signals. Power modes define legal combinations of power domain states. A power domain may be in an on state or an off state, and when a power domain is powered on, it can be further operating under different voltage states. Power modes enumerate all combinations of power domain states that the IC may legally operate in. In addition, a level shifter is required to convert one voltage level of a signal to another voltage level when the signal travels across different power domains having different voltage levels.

When a power domain is shut down, a retention (RET) block can be used to keep the circuit states of the power domain by storing the internal states of sub-circuits of the power domain into special registers in the Retention (RET) block. An isolation cell is used to isolate signals between two power domains where one is switched on and the other is switched off. The common usage of an isolation cell is to isolate an output signal of a power domain that is being switched off, from reaching a power domain that remains switched on. An isolation cell ensures that, when a power domain is turned off, its output will have a pre-defined or latched value, so that other active domains connected to it will not be affected by an unknown state of its output.

In addition to the conventional logic behavior resulting from executing the test bench and the HDL descriptions, the simulator will also carry out the descriptions in a power specification. For example, when a condition specified in the power specification becomes true, which results in powering down certain power domains, all signals belonging to those domains should become their initial values, which are either 'X' (unknown) or 'Z' (high impedance). If for some reasons a signal in a power-down domain is not 'X' or 'Z', or a signal suddenly has a value change during a power-down period, there must be an error. The error may be caused by an HDL code, by xPF descriptions, or even by a bug in the simulator itself.

It is observed that power specifications impose expectations on certain signal behaviors. For example: When a power domain shuts down, there should not be any value changes on signals in this power domain. Therefore, it is an anomaly if there are value changes on signals in a shutoff power domain. For example, when an isolation condition is on, all isolated signals of this isolation cell should have the clamp values; when retention is restored, all retained signals should recover to their previous states. These expectations can be considered as "power sequence checking rules" derived from xPF descriptions according to some embodiments of the present invention. An exemplary set of power sequence checking rules will be described in detail below.

Following are some exemplary embodiments of power sequence checking rules based on different constructs in the power specification according to the present invention. In an embodiment, power sequence checking rules to detect anomalies in signal behaviors on isolation cells may include: isolation control signal's value becomes X (unknown state); an isolation cell not being enabled before power down; an isolation cell not being disabled after power up; an isolation cell not being disabled, and the isolation signals do not have clamp values; and when an isolation cell is enabled, the isolation signals have value changes.

Power sequence checking rules to detect the anomalies in signal behaviors on retention cells may include: a retention saved signal not being enabled before power down; a retention restored signal not being enabled after power up; a retention saved or restored signal occurs during power shutoff; a retention signal being restored without having it saved first; and a saved or restored signal should not be X (except for an initial value).

Power sequence checking rules to detect the anomalies in signal behaviors in general includes: during the power off period, if any signal value changes occur under this power domain; during the power off period, if any non-isolation or non-retention signal in this power domain is not corrupted (non-X or non-Z); a power shutoff signal should not be X, except for the initial value; and an illegal power mode is found.

In some embodiments, power sequence checking rules to detect the anomalies in signal behaviors on coverage warnings may include: during a power on period, value changes do not occur in power domain; a Power mode coverage is not complete; an isolation control is not enabled; an isolation cell exists between a 'from domain' to a 'to domain', but the 'from domain' has not been turned off and the 'to domain' has not been turned on; and a power domain is always on or always off, but the always on state or off state is not specified in xPF descriptions.

It will be appreciated that the above power sequence checking rules are intended to be illustrative and not restrictive. A person of skill in the art would recognize other variations and alternatives. For example, the power sequence checking rules can specify correct signal behaviors or, in the opposite way, anomalous (incorrect) signal behaviors.

Figure 2:
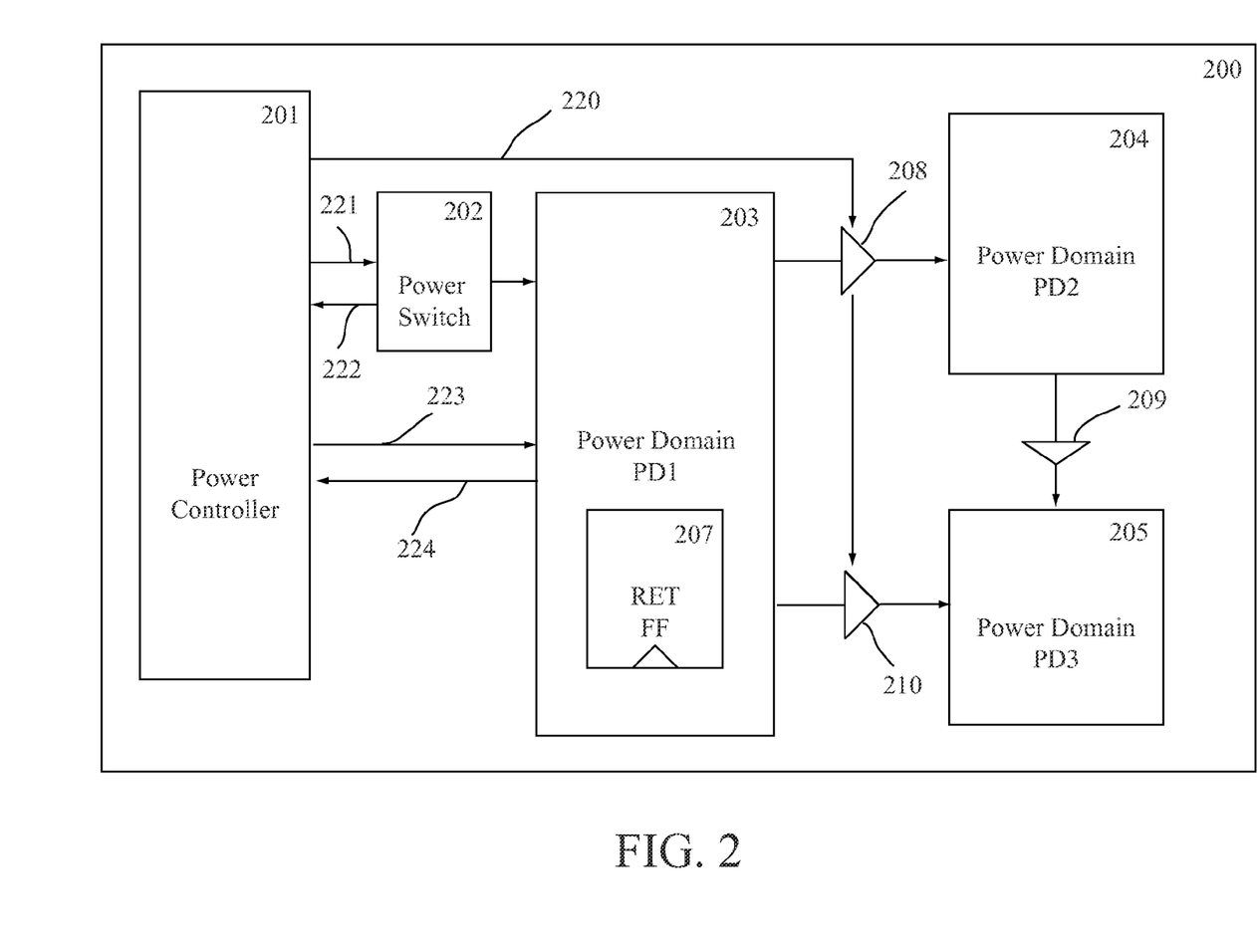
FIG. 2 illustrates an exemplary power map of an IC design in accordance with one embodiment of the present invention.

FIG. 2 illustrates an exemplary power map of an IC design 200 according to an embodiment of the present invention. Power map of the IC design 200 includes a power controller 201 configured to perform power management of the IC design, a power domain PD1 203, a power switch 202 disposed between power controller 201 and power domain PD1 203 and configured to communicate with the power controller 202 through a request signal 222 and an acknowledgement signal 221, to power down or power up the power domain PD1 203. The power map of IC design 200 further includes a power domain PD2 204, a power domain PD3 205, an isolation cell 208 disposed between power domain 203 and power domain 204, and an isolation cell 209 disposed between power domain 204 and power domain 205. In an embodiment, an isolation cell when enabled may set its output(s) to a predetermined value (clamp value). Power map of ID design 200 also includes a level shifter 210 disposed between the power domains 203 and 205. In an exemplary embodiment, isolation cells 208 and 210 are coupled to power controller 201 through an isolation control signal 220 that is configured to control isolation cells 208, 210. In addition, is the power map of IC design 200 includes a retention block 207 containing special registers configured to store signal states of sub-circuits inside power domain PD1 203 when power domain PD1 203 is shut down. In an embodiment, power controller 201 is handshaking with the power domain PD1 203, through a control signal 223 and an acknowledgement signal 224, for retention control. Please note that the power domain PD2 and PD3 are always powered on since there is no power switch connected to them. According to some embodiments of the present invention, a power map may include one or more of a power switch, an isolation cell, a level shifter cell, a power controller, a power domain, a retention block (retention cell). In an embodiment, a power switch may have a handshaking communication with a power controller. Similarly, a power domain may have a handshaking communication with the power controller.

The power map presents a top level picture for power domains and may include multiple power domains, isolation cells, level shifters, power switches, power control signals, and feedback signals. The power map in conjunction with a simulation result and a display enables a designer to find some apparent errors such as missing connections; however, certain errors can only be captured through a sequence of events generated from different sources. Therefore, a power sequence checking rule is aimed at finding all the anomalies in signal behaviors in a simulation output dump file that is generated from a simulation run of the entire IC design. For example, when the power switch is turned off at simulation time t1 (e.g., 100 ns) to shut down the power domain PD1 203; then, there is a value change on one signal of sub-circuits inside the power domain PD1 203 at simulation time t2 (e.g., 50000 ns). In such a scenario, an error is found at simulation time t2 (50000 ns) because that signal value change is an unexpected (incorrect) signal behavior or a violation of power sequence checking rules. According to some embodiments, power sequence checking rules can be generated in many different ways. For example, power sequence checking rules can be generated by separately parsing the power specification using a computing apparatus (computer, server) running specific parsing algorithms. In another embodiment, power sequence checking rules can be generated by the simulator itself, or generated manually by a designer. In some embodiments, power sequence checking rules can be added, modified or removed according to changes in the power map of design IC 200.

Figure 3A:
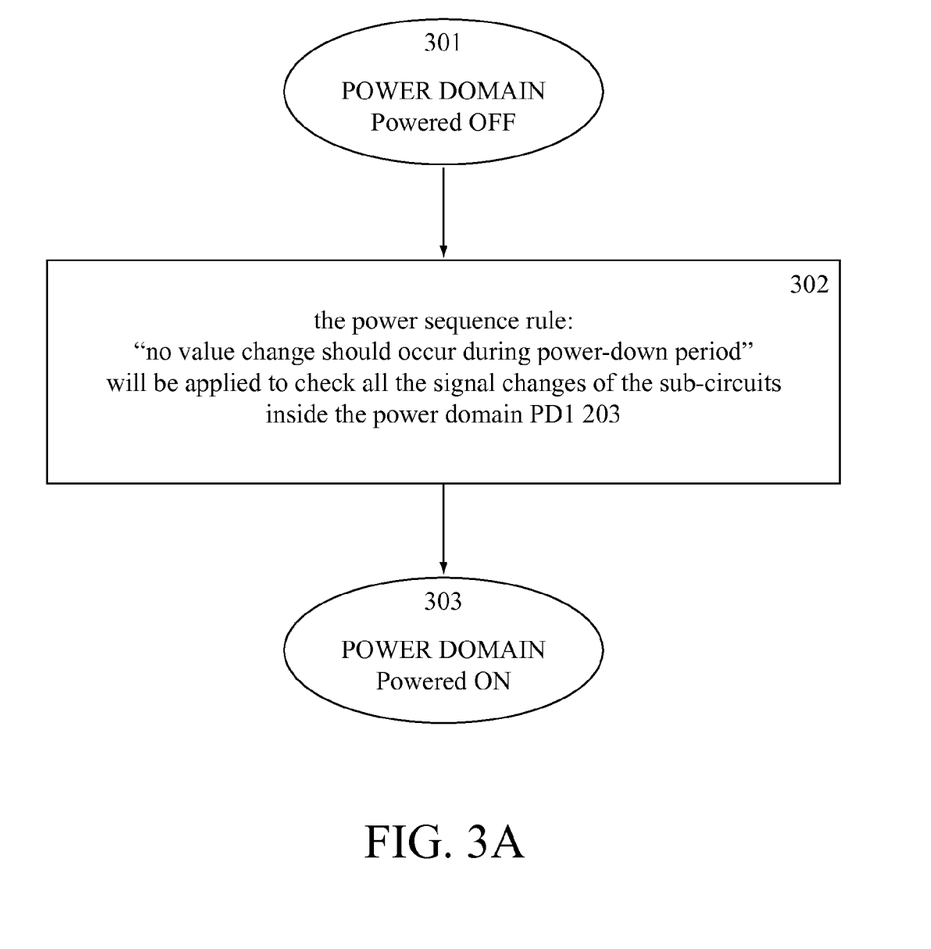
FIGS. 3A-3D illustrate examples of power sequence checking rules for checking an IC design in accordance with one embodiment of the present invention.

FIGS. 3A through 3D are examples of power sequence checking rules according to some embodiments of the present invention. FIG. 3A illustrates a power sequence checking rule for finding all the abnormal signal value changes in power domain PD1 203. As shown in block 301, when the power switch 202 is turned off to shut down the power of the power domain PD1 203, the power sequence rule of "no value change should occur during a power-down period" will be applied to check all the signal changes of the sub-circuits inside the power domain PD1 203, as shown in block 302. After the power switch 202 is turned on to provide power to the power domain PD1 203, as shown in block 302, the power sequence rule of "no value change should occur during a power-down period" will no longer apply until the next time the power switch is turned off again.

Figure 3B:
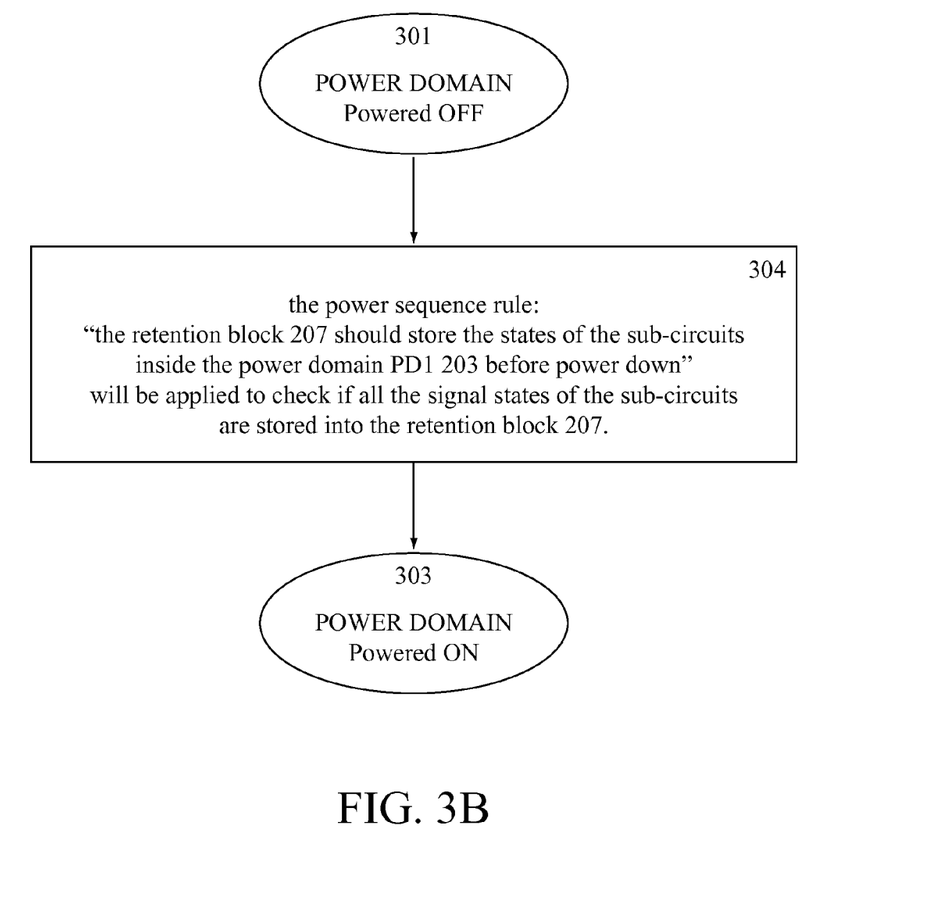
Figure 3C:
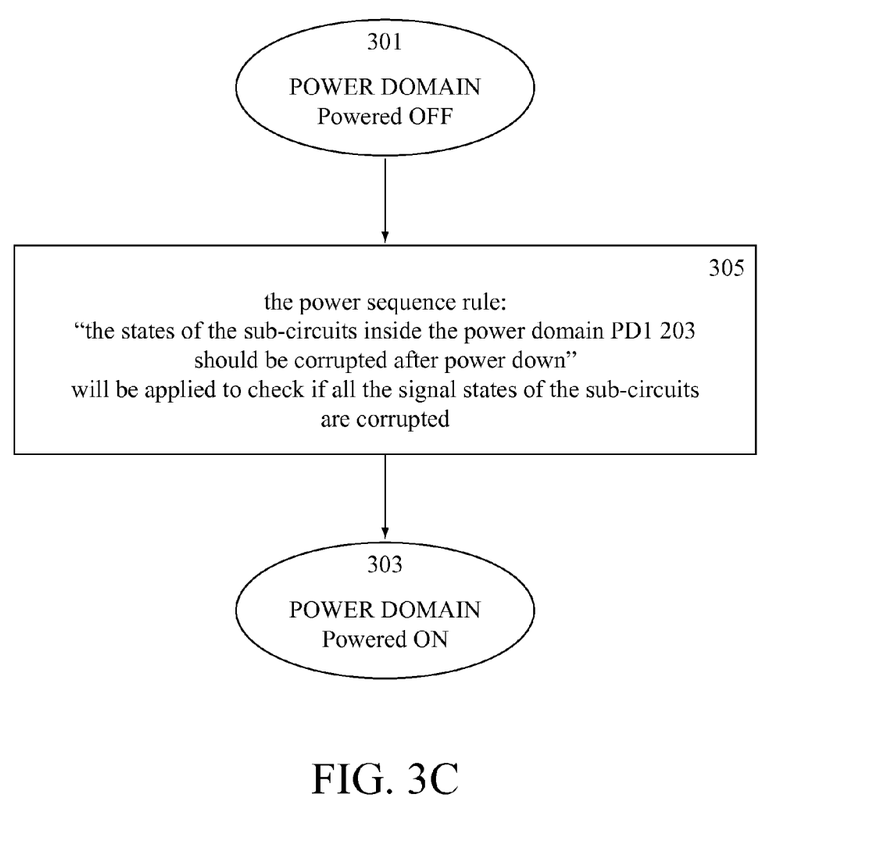
Figure 3D:
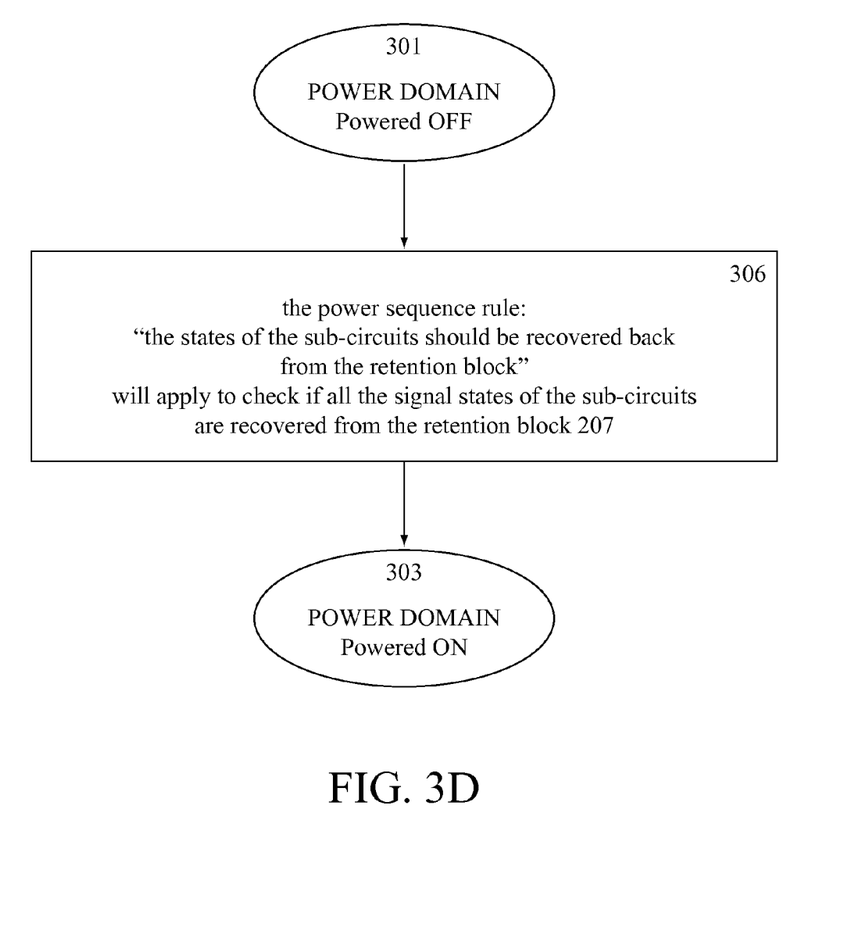

FIG. 3B illustrates a power sequence rule for checking the correctness of a retention block in power domain PD1. As shown in block 301, when the power switch 202 is turned off to shut down the power of the power domain PD1 203, the power sequence rule of "the retention block 207 should store signal states of the sub-circuits inside the power domain PD1 203 before power down" will be applied to check if the signal states of the sub-circuits are stored into the retention block 207, as shown in block 304. In addition, the power sequence rule of "signal states of the sub-circuits inside the power domain PD1 203 should be corrupted after the power domain is powered down" will be applied to check if the signal states of the sub-circuits are corrupted after the power domain PD1 203 is shut down, as shown in block 305 of FIG. 3C. After the power switch 202 is turned on to provide power to the power domain PD1 203 again, the power sequence rule of "signal states of the sub-circuits should be recovered back from the retention block" will be applied to check if the signal states of the sub-circuits are recovered from the retention block 207, as shown in block 306 of FIG. 3D.

After information relevant to the anomaly (i.e., incorrect signal changes or violation of one or more power sequence checking rules) is collected, a context of a waveform view, a schema view, a textual view and/or a "power map" view can be set up to let the designer inspect and debug the anomaly according to an embodiment of the present invention. For example, a computing apparatus having a display panel can direct the display panel to open a waveform to display the waveform of the misbehaved signal(s) and center around the simulation time of the anomaly. In another embodiment, the computing apparatus can direct the display panel to open a text window to display portions of the xPF descriptions and the HDL code associated with the misbehaved signal(s) (anomalies, violation of the power sequence checking rules, mismatches between the power map and the IC design). In yet another embodiment, the computing apparatus can direct the display panel to open a schematic window to show the schematic of the source and load of the misbehaved signal(s).

Figure 4A:
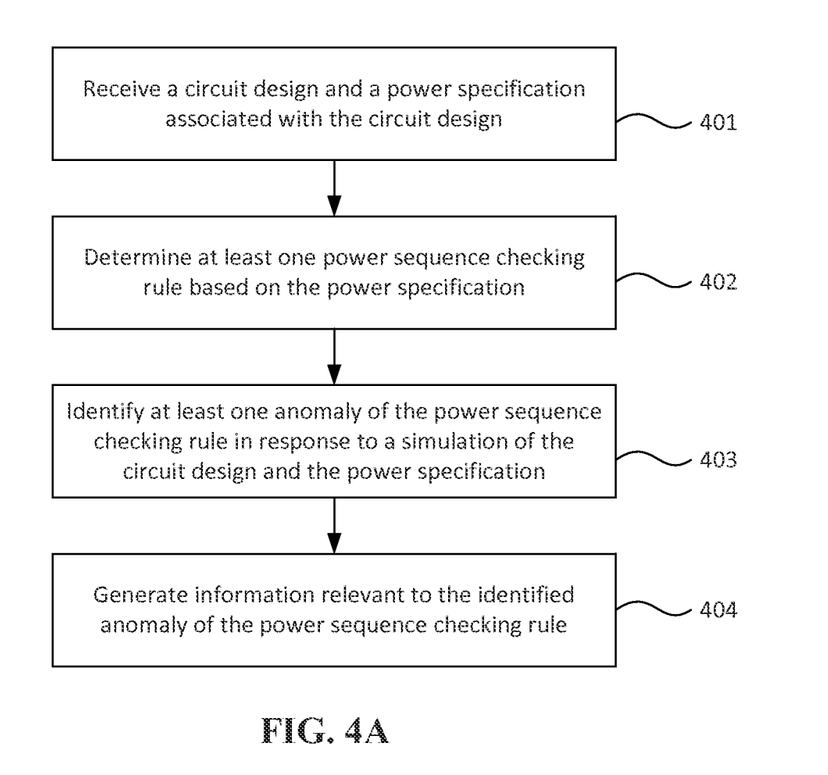
FIGS. 4A-4B illustrate flowchart diagrams of detecting anomalies of a low power IC design in accordance with one embodiment of the present invention.

In one embodiment, a computer-implemented method for detecting anomalies in a simulation of a low power IC design comprises a number of steps, as shown in FIG. 4A. At step 401, a circuit design and a power specification of the circuit design is received by a computing apparatus that contains modules for parsing the power specification, for generating power sequence checking rules based on the power specification, for running simulation, for identifying at least one anomaly of one of the power sequence checking rules, for generating information relevant to the identified anomaly, for displaying simulation results, and for setting up a context in a debugger for debugging the anomaly of the power sequence checking rules using the relevant information. At step 402, power sequence checking rules can be obtained from the power specification. For example, one of the derived power sequence checking rules is that value changes on signals should not occur in a power domain when the power domain is shut down. It will be appreciated that the above power sequence checking rules can be specified in many different ways. For example, the power sequence checking rules can specify correct signal behaviors or, in the opposite way, anomalous signal behaviors. In addition, there are many ways to generate power sequence checking rules, for example, they can be generated by parsing the power specification separately, by the simulator itself, or generated manually by a designer. The term "module" may refer to hardware, software, or a combination thereof. For example, a module may include one or more processing units executing program codes of intended functions. The term "computer readable medium" refers to any medium that provides program codes to the one or more processing units for execution. A computer readable medium may include hard disk, optical disk, RAM, ROM, EEPROM, flash memory, or any other media that can store data and codes executable by a computer having one or more processing units.

At step 403, a simulation is performed on the circuit design and the power specification to generate at least one simulation result (e.g., simulation output dump file). The simulation output dump file records all the signal values of the circuit design and the power components instantiated from the power specification. Typically, the simulation output dump file records all the value change data in a VCD (value change dump) format during a simulation run. At step 404, the dump file is searched to find an anomaly in signal behaviors, which can be an unexpected or incorrect signal behavior, or violation of the at least one power sequence rule. Afterwards, the computing apparatus may collect all information associated with the anomaly and report to designers for debugging.

Figure 4B:
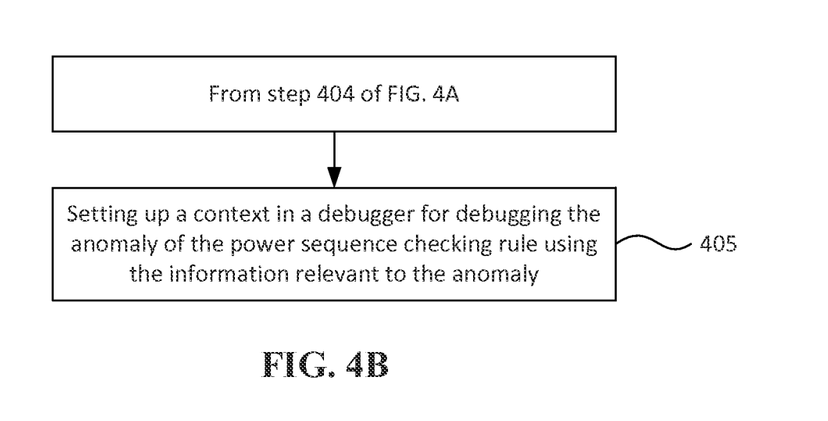

In one embodiment, after the anomaly in signal behaviors is detected, a context in a debugger can be set up for debugging the anomaly by using the information associated with the anomaly, as shown in step 405 of FIG. 4B. In an embodiment, when an anomaly is found, the following information can be collected: the specific simulation time at which the anomaly starts; the associated xPF description; the associated HDL code; and the "rule" that the anomaly violates. Furthermore, the time and condition of the nearest power mode switching prior to the anomaly can also be collected as well. For example, when a signal is found having a value change during a power-down period, the information that can be collected includes: the time the value change occurs; the related xPF description that defines the power domain; the HDL code in which the signal is declared; and the power sequence checking rule: "No value change should occur during a power-down period" that the anomaly is found violating. Furthermore the time and condition that caused the IC to enter the current power-down mode can be collected as well.

After the information associated with the anomaly is collected, the method can further put the designer in the right context of a waveform view, a schema view, a textual view and/or a "power map" view to let the designer inspect and debug the anomaly. For example, depending on the requirements set by the designer, the waveform window can be directed to display the waveform of the misbehaved signal and center around the simulation time of the anomaly; the associated xPF descriptions and the associated HDL code can also be shown in the respective text window; and the schematic window can show the schematic of the source and load of the misbehaved signal. In addition, a power map according to the circuit design and the power specification can be displayed, wherein a portion of the power map associated with the anomaly is marked and annotated with a corresponding power sequence checking rule.

Figure 5:
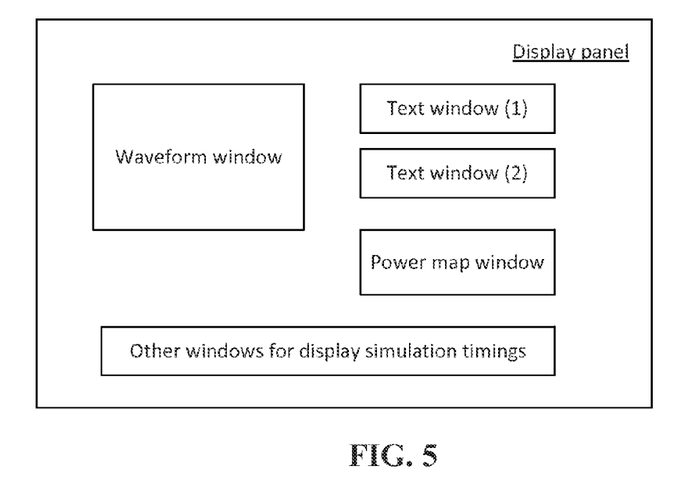
FIG. 5 illustrates an example of a user interface screen display according to an embodiment of the invention.

An embodiment of the present invention may provide a computing apparatus having a display panel for displaying waveforms and textual information associated with the detected anomalies in signal behaviors. In an embodiment, the display panel may include a waveform window configured to display one or more waveforms of misbehaved signals associated with the anomaly. The display panel may also include a first text window configured to display a portion of the circuit design associated with the anomaly and a second text window configured to display a portion of the power specification associated with the anomaly. The display panel may also include a window configured to display the power map or a portion thereof. FIG. 5 shows an exemplary display panel according to an embodiment of the present invention. It is noted that this display panel is merely an example, which should not unduly limit the scope of the claims herein. One of ordinary skill in the art would recognize other variations, modifications, and alternatives.

Figure 6:
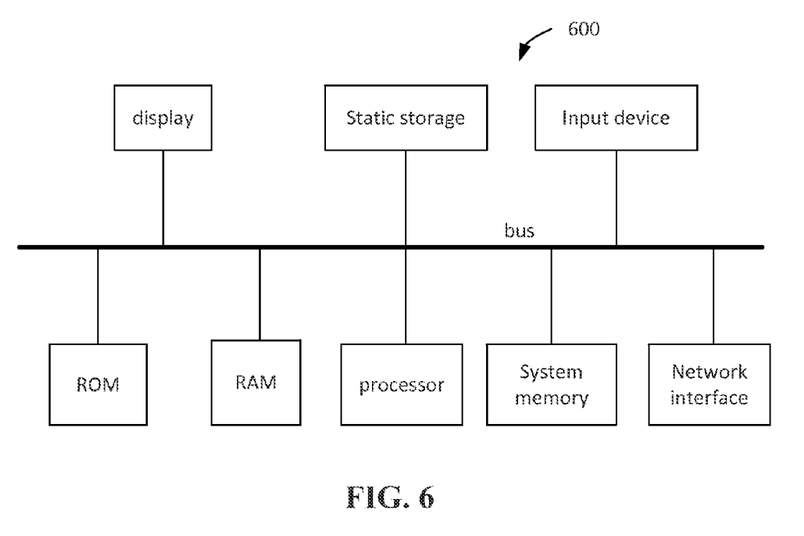
FIG. 6 illustrates a simplified block diagram of a computing apparatus according to an embodiment of the present invention.

FIG. 6 is a simplified block diagram of a computing apparatus 600 according to one embodiment of the present invention. As shown, computing apparatus 600 includes a processor having one or more processing units, a system memory, static storage units (hard drive), a display unit (LCD), an input device (keyboard, mouse, optical disc or magnetic tape reader, and the like). Computer apparatus 600 also includes a network interface unit configured to connect the computing apparatus with other devices through a local area network, a wide area network, or a wireless network. In an embodiment, the display unit has many windows for displaying simulation timings, simulation results, anomalies of misbehaved signals to assist a designer to debug a circuit design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting anomalies in signal behaviors in a simulation of a low power integrated circuit (IC), the method comprising:
   receiving, at an computing device, a circuit design and a power specification comprising a power domain including a portion of the circuit design;
   determining, with one or more processing units associated with the computing device, at least one power sequence rule based on the power specification;
   simulating the circuit design and the power specification to obtain one or more simulation results;
   identifying, with the one or more processing units associated with the computing device, at least one anomaly of the at least one power sequence rule based on the one or more simulation results; and
   generating, with the one or more processing units, information relevant to the identified anomaly of the at least one power sequence rule.

2. The method according to claim 1, further comprising:
   setting up a context in a debugger for debugging the anomaly.

3. The method according to claim 2, wherein setting up a context in a debugger comprises:
   displaying a waveform of misbehaved signals associated with the anomaly in a waveform window; and
   centering the waveform window around a simulation time at which the anomaly is detected.

4. The method according to claim 2, wherein setting up a context in a debugger comprises:
   displaying in a first text window a portion of the circuit design associated with the anomaly.

5. The method according to claim 2, wherein setting up a context in a debugger comprises:
   displaying in a second text window a portion of power specification associated with the anomaly.

6. The method according to claim 2, wherein setting up a context in a debugger comprises displaying a power map according to the circuit design and the power specification, wherein a portion of the power map associated with the anomaly is marked and annotated with the at least one power sequence checking rule.

7. The method according to claim 6, wherein the power map comprises an isolation cell having an isolation control signal configured to drive an isolation output signal, the anomaly comprising one of: "a value of the isolation control signal being X (unknown)", "the isolation cell not being enabled before a power-down event", "the isolation cell not being disabled after a power-up event"; "an output signal of the isolation cell not having a clamp value with the isolation cell being enabled", and "the output signal of the isolation cell having value changes with the isolation cell being enabled".

8. The method according to claim 6, wherein the power map comprises at least one element selected from the group consisting of a power domain, a power controller, a power switch, a retention block, a level shifter, a power control signal.

9. The method according to claim 1, wherein the power domain comprises a first sub-circuit, and the at least one power sequence rule comprises a first power sequence rule of "no value change should occur on signals of the first sub-circuit during a power-down period of the power domain".

10. The method according to claim 8, wherein the power domain comprises a retention block, and the at least one power sequence rule comprises a second power sequence rule of "the retention block should store signal states of the first sub-circuit before the power domain is powered down".

11. The method according to claim 9, wherein the at least one power sequence rule comprises a third power sequence rule of "the signal states of the first sub-circuit should be recovered back from the retention block after the power domain is powered up".

12. The method according to claim 1, wherein the circuit design is described in a hardware description language (HDL) and the power specification is described in an xPF format.

13. The method according to claim 1, wherein the anomaly is identified when the power domain does not have any value changes in an entire simulation.

14. A non-transitory computer-readable medium storing computer-executable code for detecting anomalies in signal behaviors in integrated circuit (IC) designs, the non-transitory computer-readable medium comprising:
   code for receiving a power specification associated with a circuit design, the power specification comprising a power domain for a portion of the circuit design;
   code for determining at least one power sequence rule based on the power specification;
   code for identifying at least one anomaly of the at least one power sequence rule in response to simulating the circuit design and the power specification; and
   code for generating information relevant to the identified anomaly of the at least one power sequence rule.

15. The non-transitory computer-readable medium according to claim 14 further comprising:
   code for setting up a context in a debugger for debugging the anomaly.

16. The non-transitory computer-readable medium according to claim 15, wherein the code for setting up a context in a debugger comprises:
   code for displaying a waveform of misbehaved signals associated with the anomaly in a waveform window; and
   code for centering the waveform window around a simulation time at which the anomaly is detected.

17. The non-transitory computer-readable medium according to claim 16, wherein the code for setting up a context in a debugger comprises:
   code for displaying in a text window a portion of the circuit design associated with the anomaly, a portion of the power specification associated with the anomaly, or a combination thereof.

18. The non-transitory computer-readable medium according to claim 16, wherein the code for setting up a context in a debugger comprises:
   code for displaying a power map according to the circuit design and the power specification, wherein a portion of the power map associated with the anomaly is marked and annotated with the at least one power sequence checking rule.

19. The non-transitory computer-readable medium according to claim 18, wherein the power map comprises an isolation cell having an isolation control signal configured to drive an isolation output signal, the anomaly comprising one of: "a value of the isolation control signal being X (unknown)", "the isolation cell not being enabled before a power-down event", "the isolation cell not being disabled after a power-up event"; "an output signal of the isolation cell not having a clamp value with the isolation cell being enabled", and "the output signal of the isolation cell having value changes with the isolation cell being enabled".

20. The non-transitory computer-readable medium according to claim 15, wherein the power domain comprises a sub-circuit, and the at least one power sequence rule comprises a first power sequence rule of "no value change should occur on signals of the sub-circuit during a power-down period of the power domain".

* * * * *